United States Patent
Kowalski

[11] Patent Number: 5,953,809
[45] Date of Patent: Sep. 21, 1999

[54] METHOD OF JOINING GLASS RUN CHANNELS TO BRACKETS

[75] Inventor: Daniel J. Kowalski, Lake Orion, Mich.

[73] Assignee: Trim Trends, Inc., Farmington Hills, Mich.

[21] Appl. No.: 08/936,873

[22] Filed: Sep. 25, 1997

[51] Int. Cl.[6] .................................................. B21D 39/03
[52] U.S. Cl. .......................................... 29/521; 29/522.1
[58] Field of Search ............................ 29/DIG. 11, 521, 29/522.1, 505; 403/282, 285

[56] References Cited

U.S. PATENT DOCUMENTS

| | | |
|---|---|---|
| 1,291,646 | 1/1919 | Hughes . |
| 1,981,355 | 10/1934 | Hamm .......................................... 189/72 |
| 3,000,093 | 5/1961 | Wrendenfors ............................... 29/521 |
| 3,374,014 | 3/1968 | Kull ............................................ 287/20.3 |
| 4,087,897 | 5/1978 | Scholefield ................................ 29/509 |
| 4,387,536 | 6/1983 | Prato ......................................... 49/502 |
| 4,934,101 | 6/1990 | Hannya ..................................... 49/502 |
| 5,131,258 | 7/1992 | Kynl . |
| 5,150,513 | 9/1992 | Sawdon . |
| 5,177,861 | 1/1993 | Sawdon . |
| 5,203,812 | 4/1993 | Eckold .................................... 29/522.1 |
| 5,208,973 | 5/1993 | Sawdon . |
| 5,208,974 | 5/1993 | Sawdon et al. . |
| 5,267,383 | 12/1993 | Sawdon . |
| 5,305,517 | 4/1994 | Schleicher ................................ 29/798 |
| 5,339,509 | 8/1994 | Sawdon et al. . |
| 5,431,089 | 7/1995 | Sawdon . |
| 5,435,049 | 7/1995 | Sawdon . |
| 5,560,152 | 10/1996 | Haner . |
| 5,581,860 | 12/1996 | Sawdon . |
| 5,735,081 | 4/1998 | Yamanaka ................................ 49/506 |

*Primary Examiner*—S. Thomas Hughes
*Assistant Examiner*—Steve Blount
*Attorney, Agent, or Firm*—Dykema Gossett PLLC

[57] ABSTRACT

A method of joining two dissimilar thickness metallic components includes the steps of: reducing the thickness of a component in a localized area, placing the components adjacent each other, drawing the first component into the localized area and locking the first component into the second component to form a joint.

4 Claims, 2 Drawing Sheets

STEP 3

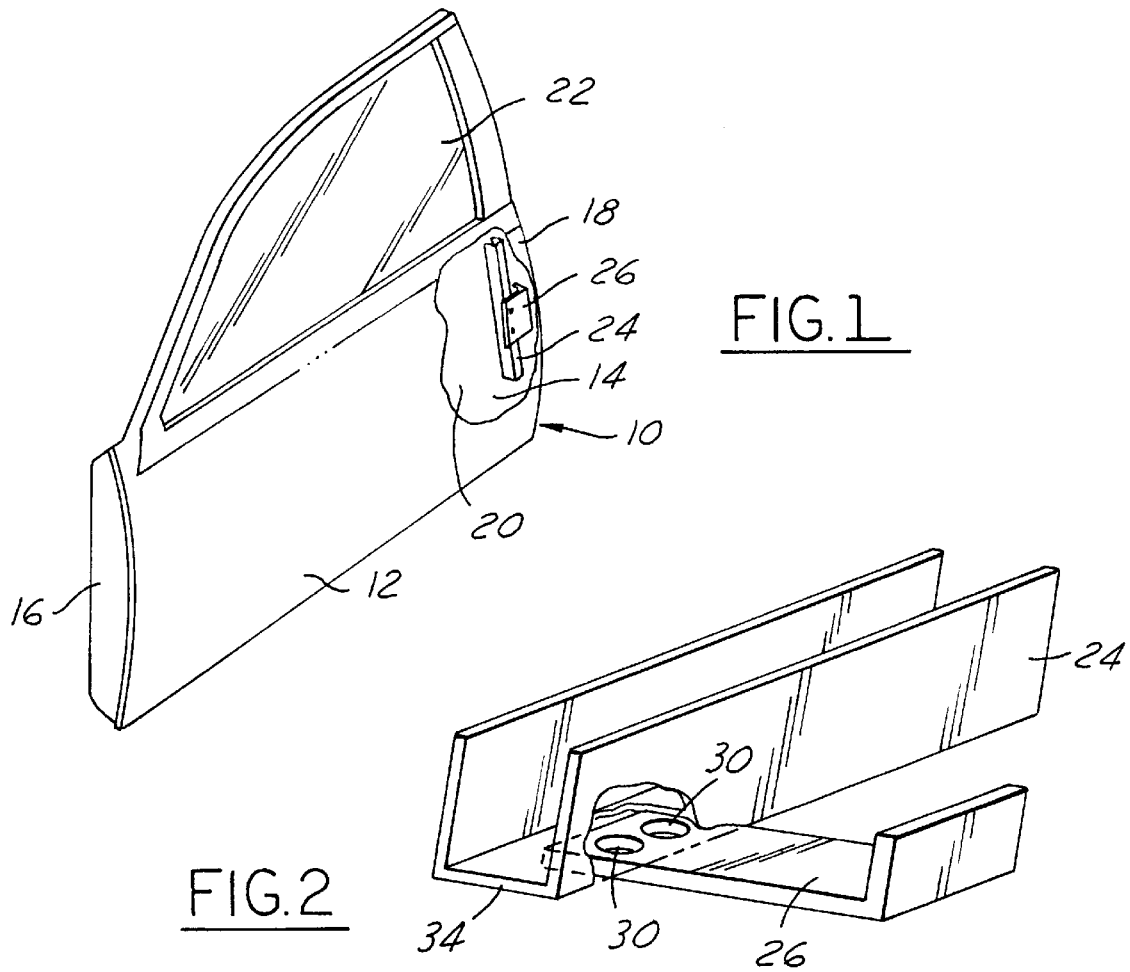
FIG. 1
FIG. 2
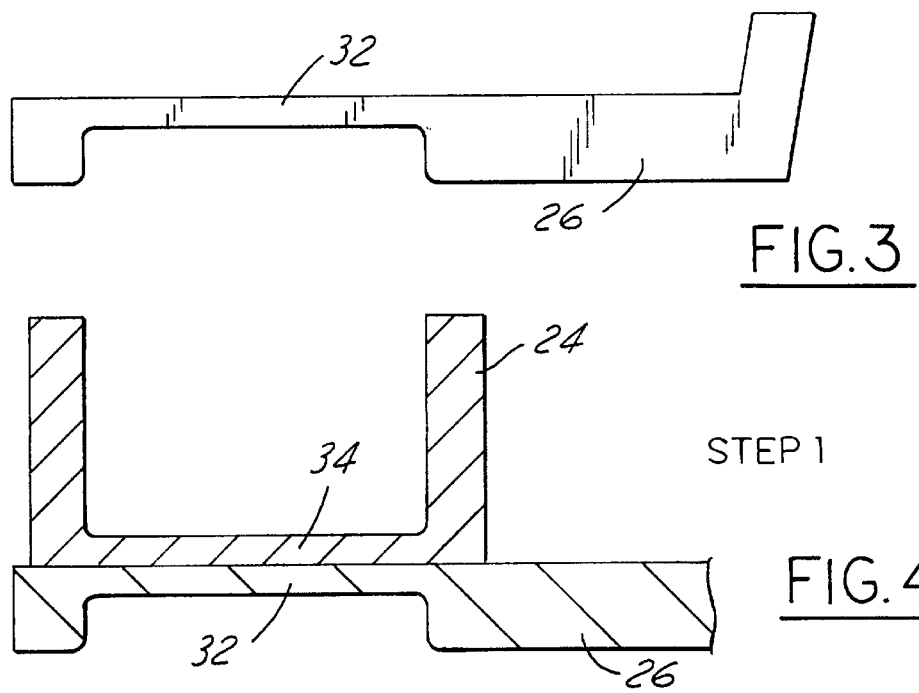
FIG. 3
STEP 1
FIG. 4

STEP 2

STEP 3

METHOD OF JOINING GLASS RUN CHANNELS TO BRACKETS

BACKGROUND OF THE INVENTION

The present invention relates generally to a method for joining metals without welding and, more particularly, to a method for joining two components formed of sheet material.

Spot welding is commonly used to join two relatively thin metal components. Steel components are typically galvanized for use in the automotive industry. Galvanization of steel components presents special processing techniques if spot welding is desired to join the component to another component. The galvanized coating layer must be burned off during spot welding to form a welded joint. Galvanized coating when burnt emits noxious fumes which must be vented in a manufacturing facility. Consequently, the spot welding must be performed under special hoods to draw the fumes out of the facility. Galvanized material also builds up on the tip of the spot welding machine. Thus the welding tip must be cleaned frequently. Both adding a hood to the plant and cleaning the tip of the welding machine increase the cost of spot welding of galvanized materials.

Another disadvantage of spot welding is that the process must be performed on two similar composition materials. If the two materials have different compositions, spot welding may not be suitable.

Punching or otherwise mechanically manipulating two thin metal materials is old in the art. Typically the metals are bent in such a manner so as to prevent them from pulling apart. By using mechanical deformation, the galvanized material does not have to be removed in a localized area for joining. By mechanically deforming the material, the above-mentioned drawbacks to spot welding are eliminated.

An apparatus for joining sheet material has been developed by BTM Corporation of Marysville, Mich. Generally, the process places the two sheet materials adjacent to each other. The sheet materials are drawn together and slightly deformed so that the two materials are joined. Essentially the top material is drawn into the bottom material. When mechanically deformed, the bottom material holds the top material in place. One problem with such a method for joining sheet material is that when such a process is used for joining dissimilar thickness materials, a weak joint may result. Typically, it is not recommended to use such a process when a relatively thin material is drawn into a relatively thick material.

In many instances on automotive vehicles various gauge materials are used on components to be joined. Such is the case for glass guide channels that are used within the door of an automotive vehicle and the brackets that hold them within the door. A glass guide channel generally is a relatively thin U-shaped channel made from formed sheet steel. The brackets that hold the channels in place are generally several times thicker than the channels due to the forces they encounter during operation of the window. It is desirable to draw the U-shaped channel into the bracket for a mechanical joint. However, because the forces are great, the relatively thin material is easily pulled from the thick material causing the joint to fail.

SUMMARY OF THE INVENTION

It is therefore an object of the invention to provide a method for joining two components having different thicknesses without welding that will withstand significant forces without decoupling.

In one aspect, the present invention provides a joint for joining a first component made of a first material having a first thickness and a second component made of a second material having a second thickness greater than the first thickness. A localized area on the second component has a reduced thickness. The first thickness extends through the plane of the second thickness to displace the localized area. The localized area is then bent to retain the first component into the second material to form the joint.

In a further aspect, the present invention provides a method for forming a side intrusion beam comprising the steps of: reducing the thickness of a component in a localized area, placing the components adjacent each other, drawing the first component into the localized area, and locking the first component into the second component.

One feature of the present invention is that it may easily be adapted for joining a glass guide channel to a bracket for use within a door of an automobile vehicle.

One advantage of the present invention is the joint is capable of withstanding large forces without decoupling.

Another advantage of the present invention is that the joint may be easily and rapidly produced without noxious fumes.

BRIEF DESCRIPTION OF THE DRAWINGS

Other features and advantages of the present invention will become apparent in the following detailed description which should be read in conjunction with the drawings, in which:

FIG. 1 is a perspective view of an automotive vehicle door having a glass guide and bracket joint according to the present invention;

FIG. 2 is a perspective view of a glass guide channel and bracket joint according to the present invention;

FIG. 3 is a cross-sectional side view of a bracket;

FIG. 4 is a cross-sectional view of the first step of the method of joining two components according to the present invention;

DETAILED DESCRIPTION OF THE PREFERRED EMBODIMENT

Figure 5:
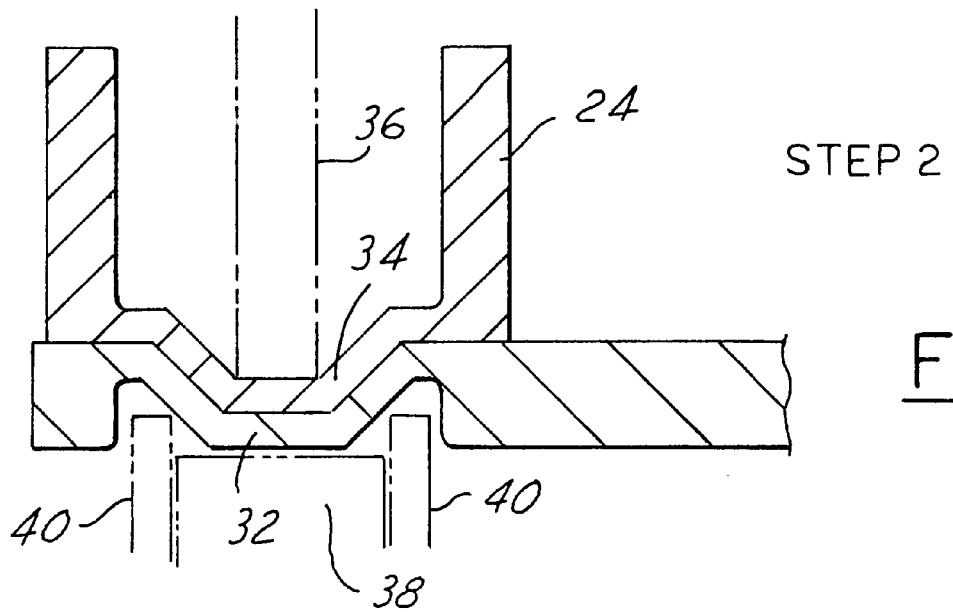
FIG. 5 is a cross-sectional view of the second step of joining two components according to the present invention.

In the following figures, like reference numerals will be used to represent like components. The figures illustrate a glass guide channel being joined to a bracket. However, other components having relatively thin cross-sections may be joined using the present invention as would be evident to those skilled in the art.

Referring now to FIG. 1, a vehicle door 10 is adapted to be hingedly mounted to a vehicle body. Door 10 includes an outer sheet metal panel 12, an inner sheet metal panel 14, and front and rear end walls 16 and 18, respectively, to which the outer and inner panels 12 and 14 are welded. Outer panel 12, inner panel 14 and end walls 16 and 18 define a door well 20 therebetween. Door well 20 includes a mechanism (not shown) for raising and lowering a window 22. The mechanism includes, among other things, a glass guide 24. Glass guide 24 guides window 22 as it is raised and lowered. Glass guide 24 is held within door well 20 by a bracket 26. Bracket 26 may be coupled to any portion of the interior support structure of vehicle as well as to rear end wall 18, as illustrated.

Referring now to FIG. 2, glass guide 24 is preferably a rectangular U-shaped channel. Glass guide 24 is preferably formed of a galvanized stamped steel material. U-shaped channel has a generally planar bottom portion 34 that is the desired location to form a joint.

Bracket 26 is also preferably formed of a stamped steel material that has been galvanized. Bracket 26 is preferably an L-shaped bracket. The preferred thickness of bracket 26 is greater than the thickness of glass guide 24. For example, the glass guide may be 0.025 inches thick while the bracket may be 0.06 inches thick. The thicknesses of bracket 26 and glass guide 24, of course, will vary depending on the loads to which they are subjected. Glass guide 24 and bracket 26 are held together with a joint 30 or preferably a pair of joints 30 formed according to the present invention.

Referring now to FIG. 3, bracket 26 is shown having a localized area 32. Localized area 32 is the area on bracket 26 where a joint 30 is to be formed. If a pair of joints are to be formed, a pair of localized areas or one large localized area may be formed. This, of course, depends on the load at the joint. The localized area is preferably minimized to be just larger than and the same shape as the joint to be formed. Localized area 32 has a thickness that has been reduced compared to the remaining portions of bracket 26. Localized area 32 has a thickness that is substantially equal to that of the component to which it is to be joined. In this case, the thickness of glass guide 24 is used. Localized area 32 is preferably formed during the stamping of bracket 26. Localized area 32 may also be formed after stamping by performing a separate coining operation.

Referring now to FIG. 4, the components to be joined are brought together. That is, localized area 32 is placed adjacent to bottom portion 34.

Referring now to FIG. 5, the adjacently placed components are then drawn together during the early stages of the process. Drawing the material together forces one material into another so that they deform together in a similar manner.

An apparatus that may be utilized for forming a joint according to the present invention includes a punch 36, an anvil 38 and a die arrangement 40. The anvil 88 is bordered by the die arrangement 40. The die arrangement 40 is positionally extended beyond the lower boundary of the bracket 26. Punch 36 forces a portion of the generally planar bottom portion 34 and generally planar localized area 32 below the plane of bracket 26. Punch 36 pushes bottom portion 34 and localized area 32 into anvil 38.

Figure 6:
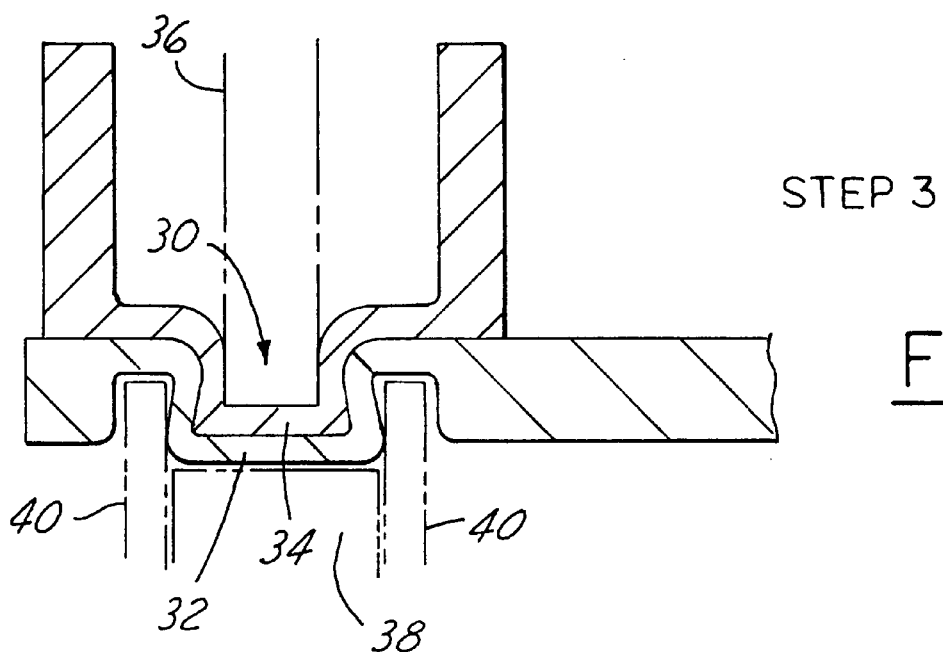
FIG. 6 is a cross-sectional view of the third step of joining two components according to the present invention.

Referring now to FIG. 6, as punch 36 pushes bottom portion 34 and localized area 32 into anvil 38, a joint 30 is formed. Joint 30 has localized area 32 that is bowed outwardly. Bottom portion 34 is also deformed outwardly from where punch 36 contacts the area where joint is to be formed. This outward bowing holds bracket 26 to glass guide 24. Die arrangement 40 prevents the outward bowing effect from exceeding a predetermined limit. The predetermined limit is set so that neither bracket 26 nor glass guide 24 ruptures during the formation of the joint. Rupturing the joint is undesirable since the area of the rupture will not be coated with galvanized material. This reduces the corrosion resistance of the components. In a properly formed joint, the corrosion resistance is retained since the galvanized material does not have to be removed from either of the components at the location of the joint.

In operation, various machines may be used to draw the first component into the second component to form the joint. As illustrated in FIG. 2, it may be desirable to form two joints between the two components to hold the two components together. It may be desirable to provide a joint forming machine that performs both joints simultaneously.

While the best mode for carrying out the present invention has been described in detail, those familiar with the art to which this invention relates will recognize various alternative designs and embodiments for practicing the invention as defined by the following claims.

What is claimed is:

1. A method of joining two metallic components, a first component having a first thickness with a first planar region and a second component having a second thickness greater than the first thickness, the second thickness having a lower boundary comprising:

reducing the second thickness of the second component in a holeless localized area to a third thickness forming a second planar region;

placing the first component and first planar region adjacent to the second component localized area second planar region;

extending a die arrangement toward the second component beyond the lower boundary of the second thickness; and punching the first planar region toward the second planar region toward an anvil bordered by the die arrangement wherein the first planar region and the second planar regions are deformed without rupture and wherein the first planar region is displaced to a position beyond an initial position of the second planar region and the second planar region is laterally bound by the die arrangement and where the first and third thickness are locked together.

2. A method of joining as recited in claim 1 wherein said third thickness is substantially equivalent to said first thickness.

3. A method of joining a glass guide channel having a first thickness with a first planar region with a bracket with a second thickness greater than the first thickness, the second thickness having a lower boundary comprising:

reducing the second thickness of the bracket in a holeless localized area to a third thickness forming a second planar region;

placing the first glass guide channel and first planar region adjacent to the bracket localized area second planar region;

extending a die arrangement toward the bracket beyond the lower boundary of the second thickness and;

punching the first planar region and the second planar region toward an opposed anvil bordered by the die arrangement wherein the first planar region and the second planar regions are deformed without rupture and where the first planar region is displaced to a position beyond an initial position of the second planar region and the second planar region is laterally bound by the die arrangement and wherein the first and third thickness are locked together.

4. A method of joining as recited in claim 3 wherein said third thickness is substantially equivalent to said first thickness.

* * * * *